UNITED STATES PATENT OFFICE.

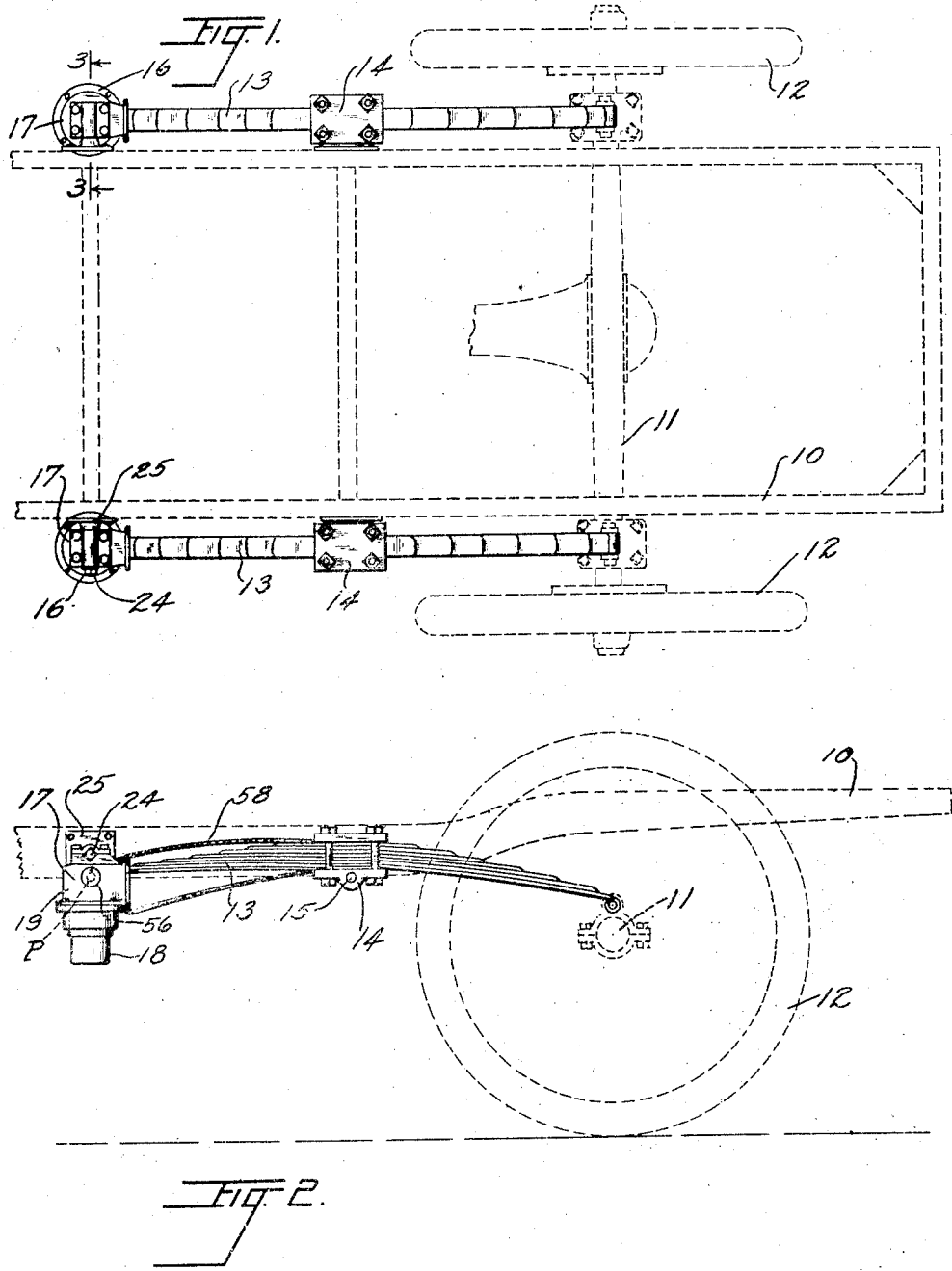

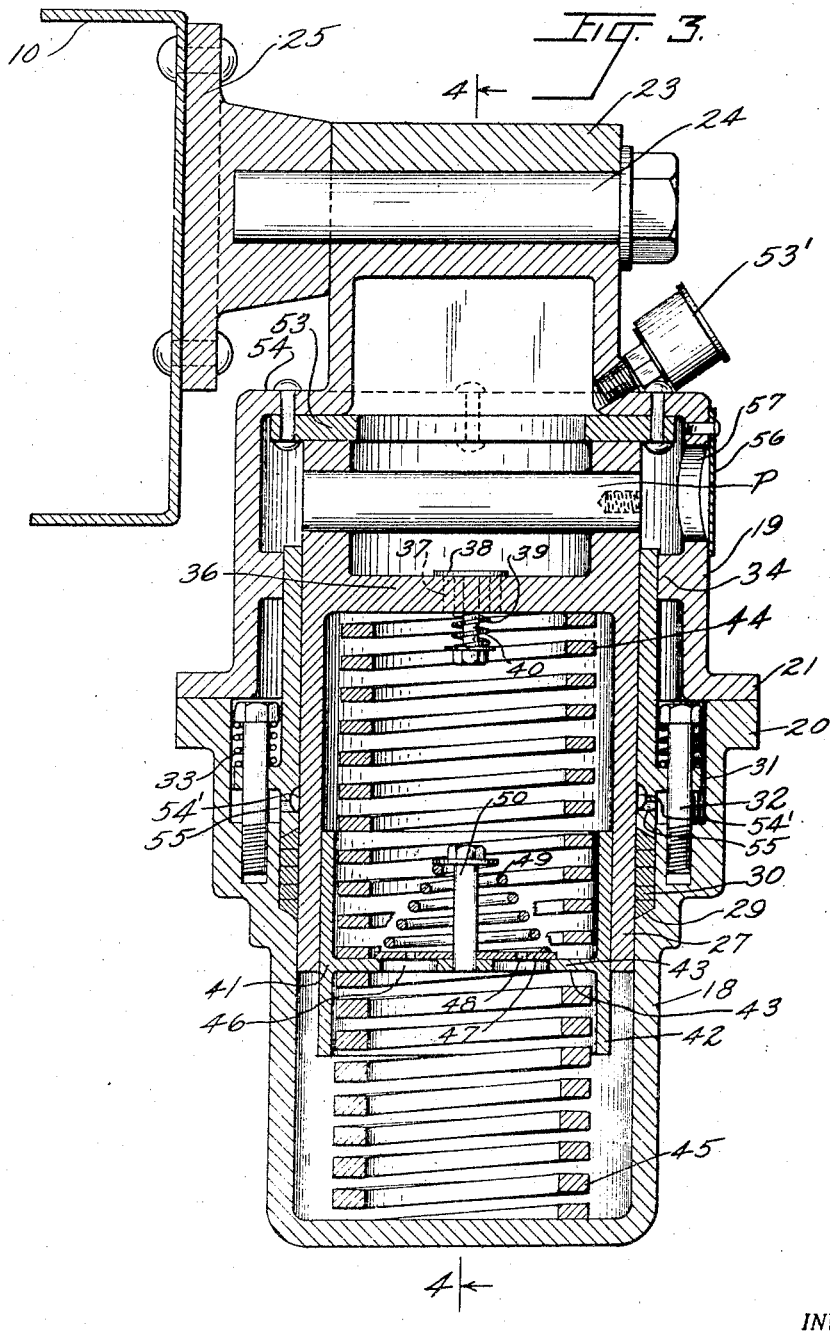

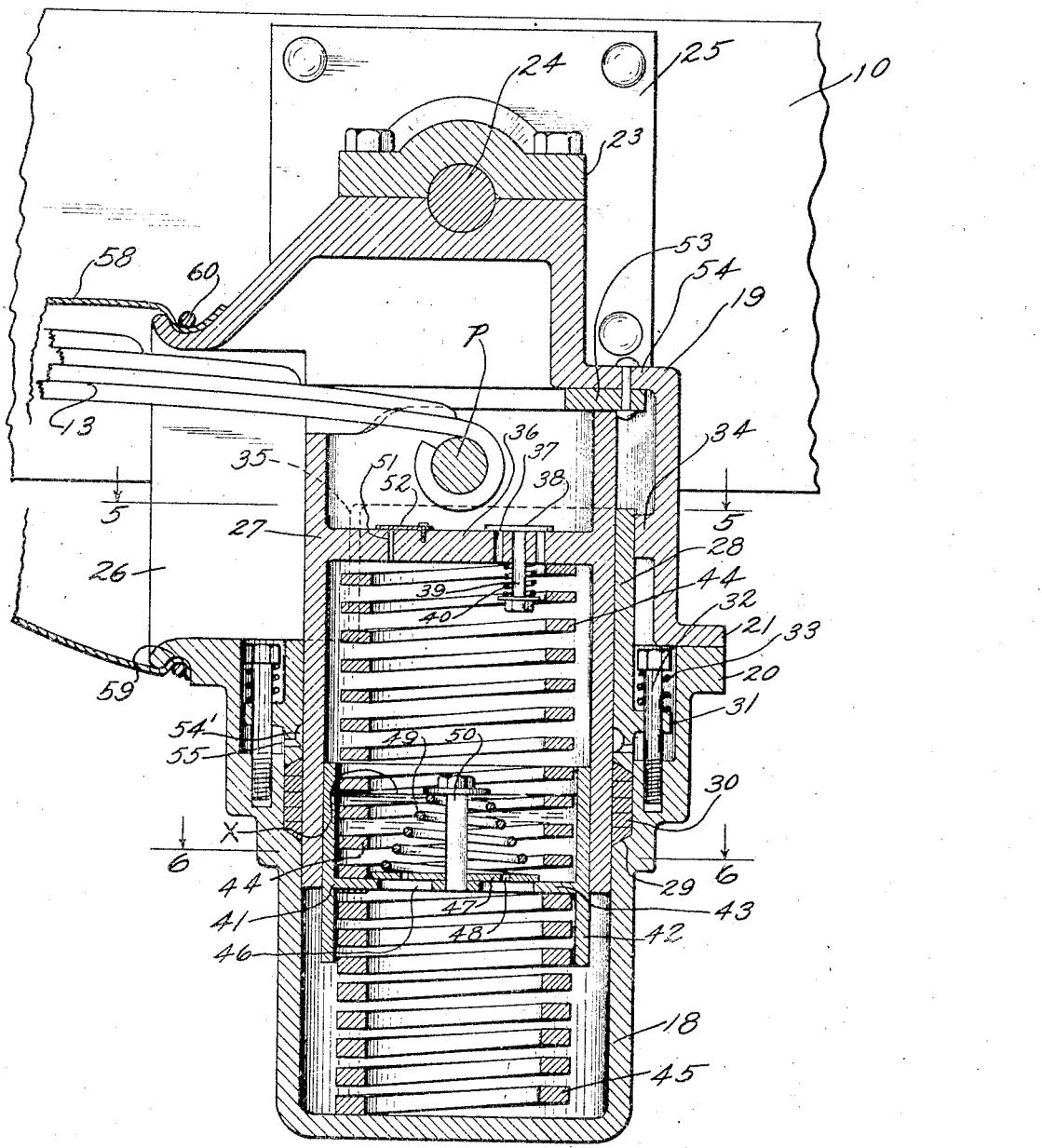

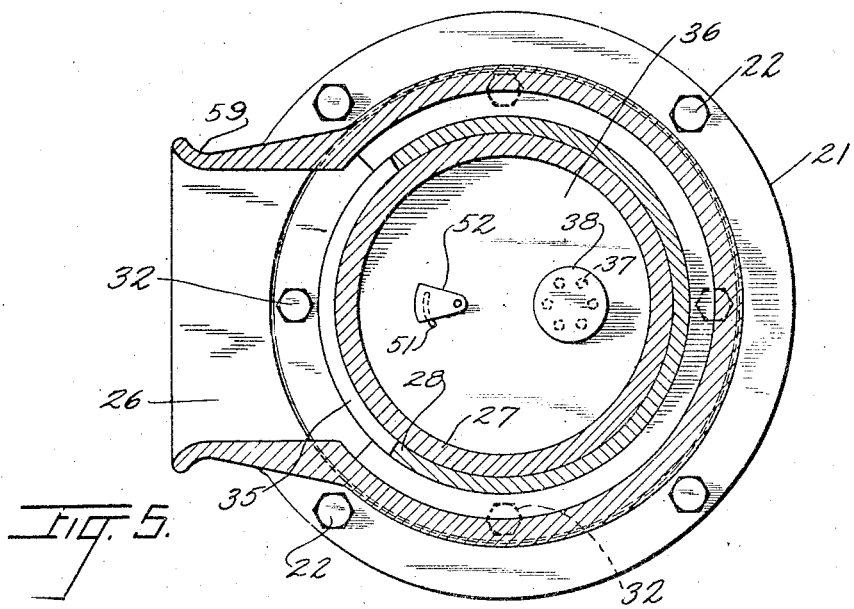
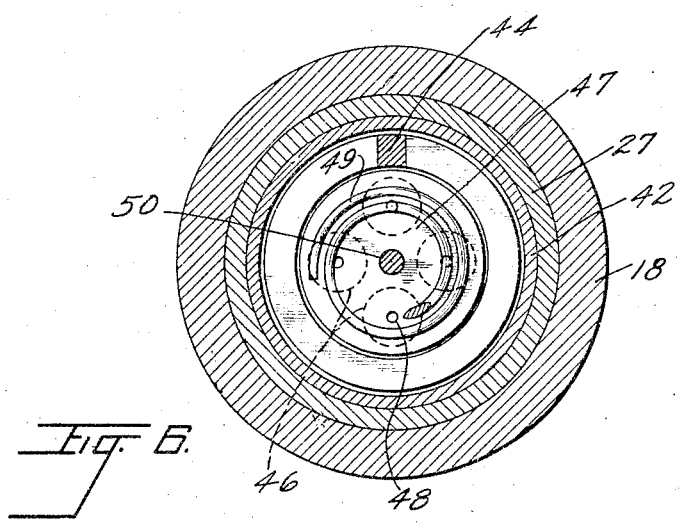

GEORGE H. IRWIN, OF CHICAGO, ILLINOIS.

SHOCK-ABSORBER MECHANISM.

1,417,918.  Specification of Letters Patent.  Patented May 30, 1922.

Application filed June 13, 1919. Serial No. 303,914.

*To all whom it may concern:*

Be it known that I, GEORGE H. IRWIN, a citizen of the United States, and a resident of Chicago, in the county of Cook and State of Illinois, have invented certain new and useful Improvements in Shock-Absorber Mechanism, of which the following is a specification.

My invention relates to improved shock absorber mechanism adapted particularly for use with springs of the cantilever type.

Among the other important objects of my invention are: to provide an improved and simple shock absorbing device which can readily be substituted for the shackles which now anchor the inner end of the cantilever springs to the vehicle body frame; to provide a shock absorbing device which is entirely enclosed and its operating parts fully protected; to provide a construction and arrangement in which the shock absorbing movements of the operating parts are diametrically opposite to the direction of movement of the axle structure to which the vehicle springs are attached; to provide a shock absorber device in which springs cooperate to absorb the shocks during running of the vehicle and which vacuum resistance retards the recoil of these springs and eliminates rebound shocks by the vehicle springs and in general, to provide construction, arrangement and operation which particularly adapt the shock absorber device for use with cantilever type springs but which can be readily modified to adapt the device for use with other types of springs.

The various features of my invention are clearly disclosed by the accompanying drawings, in which—
Fig. 1 is a plan view of the rear end of an automotive vehicle chassis showing my improved shock absorbers in place, Fig. 2 is a side elevational view of the parts shown in Fig. 1, Fig. 3 is an enlarged sectional view on plane 3—3, Fig. 1, Fig. 4 is a sectional view on plane 4—4, Fig. 3, Fig. 5 is a sectional view on plane 5—5, Fig. 4, and Fig. 6 is a sectional view on plane 6—6, Fig. 4.

Referring to Figs. 1 and 2, 10 represents the load supporting body frame of the vehicle, 11 represents the rear axle structure, and 12 the vehicle rear wheels. On each side of the body frame is a cantilever spring 13, whose leaves are secured together intermediate their ends by a clamping frame 14, the clamping frames of the springs being pivoted on the ends of a shaft 15 which is supported on the body frame and extends transversely thereof, the springs being thus fulcrumed to cant in vertical planes. The rear ends of the springs are secured in a usual manner to the rear axle structure, but between the inner ends of the springs and the vehicle body frame, shock absorber devices 16 are interposed. The outer or cylinder part 17 of each shock absorber is secured to the body frame and the inner ends of the cantilever springs extend into the outer parts to connect with movable shock absorbing mechanism therein in a manner which will be later fully described in detail.

The details of construction of the shock absorbing device are clearly shown in Figs. 3 to 6. The outer member comprises the lower cylindrical cup shaped part 18 and the top part 19, the parts being secured together at their meeting flanges 20 and 21 by bolts or screws 22. At its top, the outer or cylinder member is detachably hung by means of the cap 23 from the pin 24 which extends from the bracket 25 secured to the side beam of the load supporting body frame 10 of the vehicle, the device being thus adapted to swing. The top part 19 has the side opening 26 into which extends the inner end of the corresponding vehicle spring 13. Reciprocable within the outer or cylinder member, is the cylindrical piston structure 27, in the form of a shell or sleeve, the inner end of the vehicle spring receiving the pin *p* extending diametrically across and supported by the upper end of the piston structure.

The adjacent ends of the upper and lower parts 19 and 18 of the cylinder member are expanded diametrically to make room for a stuffing gland or sleeve 28 whose inner surface forms a continuation of the inner surface of the lower end of the part 18, the piston structure engaging with both these surfaces. The lower tapered end of the stuffing gland terminates a distance above the tapered shoulder 29 on the part 18 and between these surfaces is applied stuffing material 30 preferably in the form of metallic flexible antifriction material. Extending from the stuffing gland is the annular flange 31 through which screws 32 extend into threaded engagement with the lower part 18 of the cylinder member, springs 33 being interposed between the flange and the screw heads so that when the screws are turned down, the packing material will be put under compression and any contraction or wear thereof immediately taken up. The upper part 19 of the cylinder member has the internal annular flange 34 for aligning the upper end of the stuffing gland so that such gland together with the packing and the lower end of the part 18 form a true cylinder in which the piston structure can easily reciprocate. The side of the stuffing gland is cut away sufficiently to leave the clearance opening 35 for the end of the vehicle spring when such spring forces the piston structure downwardly in the cylinder member.

Just below the spring receiving pin $p$, a partition 36 extends across the piston structure which is continuous except for the passageways 37 therethrough. A valve disc 38 is provided to close the passageways, the disc being above the partition and secured to the valve stem 39, the spring 40 interposed between the head of the stem and the partition tending to hold the disc 38 in position to close the passageways.

Reciprocable within the piston structure 27, which I will call the main piston structure, is what I will call a floating piston structure designated as a whole by 41 and comprising the cylindrical shell 42 and the transverse wall 43, the shell having intimate bearing engagement with the main piston structure. Within the piston structure and interposed between the walls 36 and 43 thereof, is the helical compression spring 44, while between the wall 43 of the floating piston and the bottom wall of the part 18, is interposed the helical compression spring 45, the spring 45 being shorter and heavier than the spring 44.

The wall 43 has a number of large passageways 46 therethrough which are normally covered by a valve disc 47 through which are restricted passageways 48. A spring 49 interposed between the valve disc and the head of the stem 50 extending from the wall 43, tends to hold the valve in position to close the large passageways 46. The lower part of the cylinder member is filled with fluid such as oil, the line $x$ showing the fluid level, while the space between the oil and the wall 36 is normally filled with air. When the piston structure is forced downwardly, the air will be compressed and will force the valve 38 from its seat and escape through the passageways 37. When the piston is shifted upwardly, the spring 40 will close the valve 38 to shut off the passageways 37. 51 represents a by-pass which may be provided through the wall 36 for air, means such as a plate 52 serving for opening said passageway to any degree. The size of the passageway determines the rapidity of upward movement of the piston for the larger the passageway, the faster air can flow into the piston structure. The ring 53 supported on the annular shoulder 54 of the upper frame part 19 is of fiber or other cushioning material which will cushion the impact of the piston structure.

During travel of a vehicle, the large cantilever springs will take up the more intense shocks but the shock absorber devices will take up and absorb the short rapidly repeated shocks or vibrations. For each upward impulse against the rear end of the spring, the spring will be canted and its front end swing downwardly. With such downward movement of the spring end, the piston structure 27 is shifted downwardly and the springs 44 and 45 are compressed. Thus smaller shocks are taken up by the canting of the cantilever springs and the compression of the shock absorber springs and none of the shock is communicated to the vehicle body. Even for larger obstruction, the first impact is taken up to a considerable extent by the shock absorber devices, and the blow is thus gradually communicated to the vehicle body instead of abruptly. The shock absorber device itself applies its spring resistance gradually, for the light longer spring 44 is first compressed, and later the heavier spring 45 is compressed.

When the piston structure is shifted downwardly in the cylinder member, the air within the piston structure is compressed but escapes through the valve passageways 37. The floating piston structure 41 is also forced downwardly and pressure is applied to the oil below it, but the pressure raises the valve disc 47 and the oil flows through passageways 46. Thus, there is nothing to hinder the shock absorber springs from being compressed. However, upward movement of the piston structure is retarded, so that sudden rebound of the vehicle springs is prevented. As soon as downward pressure on the piston structures is withdrawn, the springs 44 and 45 tend to expand. However, immediately upon such expansion the piston structures will tend to rise. The spring 44 having been compressed a greater distance than the spring 45 will tend to shift the piston structure 27 upwardly faster than the floating piston structure, but the air valve 38 being closed, such movement will be resisted, as any relative movement between the piston structures tending to separate them when the valve 38 is closed will cause reduction of the pressure within the piston structure below the air pressure against the outside of the wall 36. As soon as the spring 45 expands and raises the floating piston structure, pressure will be exerted against the top of the valve 47 and the large passageways 46 will be closed, leaving only the restricted passageways 48, this restricted flow of the oil causing retardation of the upward movement of the floating piston structure so that sudden opening or rebound of the spring 45 is prevented.

The degree of resistance to upward movement of the piston structure 27 relative to the floating piston structure can be adjusted by the plate 52 in connection with the by-pass 51. The greatest retardation is, of course, operative when the by-pass is closed, for then the space within the piston 27 is entirely enclosed and the entire atmospheric pressure downwardly on the piston would have to be overcome before the piston could rise relatively to the floating piston. Thus, the compression springs in the shock absorber device can open or expand only gradually, and rebound or recoil of these springs and of the cantilever springs is prevented. Of course, as soon as the inner end of the cantilever spring is deflected downwardly when the wheel strikes the next bump, the piston structure 27 will be suddenly shifted downwardly and the air valve will open.

When the parts are assembled together to form the shock absorber, the part 18 is filled to the suitable depth with oil. Supported on the part 19 above the piston structures, is the oil cup 53' by means of which oil may be added to the device, the oil running into the compartment above the partition wall 36 and flowing into the cylinder structures whenever the valve 38 is opened. During reciprocation of the piston structures, oil is carried between the bearing surfaces. The packing 30 tends to prevent leaking of air into the lower end of the part 18 during upstroke of the piston structures. However, when the spring 45 tends to go upwardly, and the flow of oil is restricted by the passageways 48, the packing will yield sufficiently to the suction produced to permit the suction effect to reach the annular groove 54' formed in the stuffing gland, this groove being connected by passageways 55 with the space between the flange 31 and the frame 18, so that any oil received in the groove and in the the space during reciprocation of the piston structures will be sucked back into the lower end of the part 18.

56 represents a closure plate for the opening 57 opposite the end of the pin $p$, this permitting assembly of the shock absorber device with the vehicle spring.

In order to protect the shock absorber device against the entrance of dust or dirt through the side passageway 27, a flexible boot or stocking 58 is provided which surrounds the vehicle spring and is fastened to the spring at its outer end, and at its inner end is secured in the groove 59 by means of a tie member 60.

The distance between the pin $p$ and 24 is such that the shock absorber device can be readily substituted for the ordinary shackle which heretofore anchored the inner end of the cantilever spring to the vehicle body frame. To install my improved shock absorbers, all that is necessary is to remove these shackles and to secure the brackets 25 to the respective side beams of the body frame. The shock absorber devices are then secured on the pin 24 and the pins $p$ are inserted and receive the inner ends of the vehicle springs. The shock absorber devices are thus placed a considerable distance in front of the rear axle structure and a considerable part of the shocks on the front axle structure are taken up by the shock absorber. Although the shock absorber shown is designed particularly for use with cantilever springs, it could be readily adapted for use with other types of springs.

Having described my invention, I claim as follows:

1. A shock absorber device comprising a cylinder member, a main piston member reciprocable within said cylinder member, a floating piston member reciprocable within said main piston member, a light compression spring between said floating piston member and the upper wall of said main piston member, a heavier compression spring between said floating piston member and the bottom of said cylinder member, fluid in said cylinder member, a check valve in said floating piston member, said check valve permitting free downward movement of said floating piston structure, but retarding the upward movement thereof, means for permitting the outflow of air from said main piston member when said member is shifted downwardly, and means for retarding the inflow of air when said piston rises, whereby to retard the upward movement thereof.

2. In a shock absorber device, the combination of a cylinder member, a hollow main piston member reciprocable within said cylinder member, a floating piston member reciprocable within said main piston member, a compression spring between said floating piston member and the end of said main piston member, a compression spring between said floating piston member and the end of said cylinder member, a check valve in the end of said piston member adapted to permit the outflow of air but to resist the inflow of air to said main piston member, and a check valve for said floating piston member permitting unrestricted flow through said floating piston member when said springs are being compressed and for retarding the flow when said springs expand.

3. In a shock absorber device, the combination of a cylinder member adapted for attachment to a vehicle body and having a side opening near its top for the entrance of a vehicle spring, a main piston member reciprocable within said cylinder member and adapted for connection at its upper end with the vehicle spring, a floating piston member reciprocable within said main piston member, a light compression spring between said floating piston member and the end of said main piston member, a heavier compression spring between said floating piston member and the bottom of said cylinder member, fluid in said cylinder member and air in said main piston member, a check valve in the end of said main piston member adapted to permit the expulsion of air but to resist the inflow of air to said main piston member, a check valve for said floating piston member adapted to permit unrestricted flow of fluid from below to above said floating piston member when said member is shifted downwardly but to retard the flow of fluid when the floating piston member is shifted upwardly.

4. In a shock absorber device of the class described, the combination of a cylindrical enclosure member, a hollow piston structure telescoping into said enclosure structure from the top thereof, said piston structure being adapted for connection at its upper end with a vehicle spring, a floating piston reciprocable within said main piston and having valve controlled passageway therethrough, a light compression spring between said main piston structure and the floating piston structure, and a heavy compression spring between said floating piston and the bottom of said enclosure structure.

In witness whereof, I hereunto subscribe my name this 9th day of June, A. D. 1919.

GEORGE H. IRWIN.